United States Patent [19]
Kögler et al.

[11] 3,967,174
[45] June 29, 1976

[54] ELECTRONIC COMMUTATION APPARATUS FOR A BRUSHLESS D.C. MOTOR

[75] Inventors: Georg Kögler, Schwabach; Hans Kühnlein, Nurnberg-Grossgrundlach; Manfred Liska, Nurnberg, all of Germany

[73] Assignee: Siemens Aktiengesellschaft, Munich, Germany

[22] Filed: Sept. 26, 1974

[21] Appl. No.: 509,680

[30] Foreign Application Priority Data
Oct. 3, 1973  Germany............................ 2349770

[52] U.S. Cl................................ 318/254; 318/138; 318/331
[51] Int. Cl.[2].......................................... H02K 29/00
[58] Field of Search ............ 318/138, 254, 685, 696

[56] References Cited
UNITED STATES PATENTS

| | | | |
|---|---|---|---|
| 3,735,216 | 5/1973 | Uemura | 318/138 |
| 3,750,000 | 7/1973 | Bruckner | 318/138 |
| 3,766,456 | 10/1973 | Carow | 318/138 |

Primary Examiner—James R. Scott
Assistant Examiner—John W. Redman
Attorney, Agent, or Firm—Kenyon & Kenyon Reilly Carr & Chapin

[57] ABSTRACT

This invention is for apparatus used in combination with electronic commutation circuitry for a D.C. motor with a Y-connected stator winding wherein current control is accomplished by means of a cyclic current regulator. Current to the regulator is applied to the regulator by means of a series connected choke inductor and resistor, across which is connected in parallel a by-pass diode.

3 Claims, 2 Drawing Figures

ELECTRONIC COMMUTATION APPARATUS FOR A BRUSHLESS D.C. MOTOR

BACKGROUND OF THE INVENTION

1. Field of the Invention

This invention concerns electronic commutation for a brushless D.C. motor having a Y-connected stator.

2. Description of the Prior Art

Such a brushless D.C. motor is shown in the German publication, ETZ, 1972, pages 295 and 298. A separate control stage, cyclically controlled by a current regulator, is provided for the current control of this motor. Cyclic control has the advantage over continuous control in that the losses are lower and higher efficiency is thereby achieved. This advantage is counterbalanced, however, by the cost of separate control stage.

Deutsche Auslegeschrift No. 1,244,933 shows a brushless D.C. motor in a bridge circuit, in which the cyclic control of the current is effected directly by means of an electronic commutation device and therefore, no separate control state is required. By-pass diodes are connected parallel to the two commutation devices so that the current can continue to flow in the motor winding during the current intervals. Such a circuit design is not possible, however, for brushless D.C. motors with a Y-connected stator winding.

It is an object of this invention to provide a brushless D.C. motor with a Y-connected stator winding and cyclic current control, in which the current can be controlled directly by means of an electronic commutation device.

SUMMARY OF THE INVENTION

According to the invention, the above objective is achieved in a brushless D.C. motor of the kind described by connecting a smoothing choke and a resistor directly in series and parallel thereto a by-pass diode. This circuit is connected to a current regulator which cycles the commutation device.

It has been discovered that the mean value of the current flowing in the stator winding of the motor is proportional to the mean value of the current flowing in the smoothing choke, so that, if the current in the smoothing choke is controlled, the motor current flowing in the stator winding is controlled accordingly. This discovery makes it possible to connect a by-pass diode across the smoothing choke so that current flows continuously in the choke, while the current flow in the stator winding is cycled. By connecting the by-pass diode parallel to the smoothing choke and the resistor for measuring the actual value of the current, it is therefore possible to control the current directly by means of the commutation device.

According to one embodiment of the invention, it is possible to linearize the characteristic by connecting a resistor in series with the by-pass diode.

DESCRIPTION OF THE INVENTION

Figure 1:
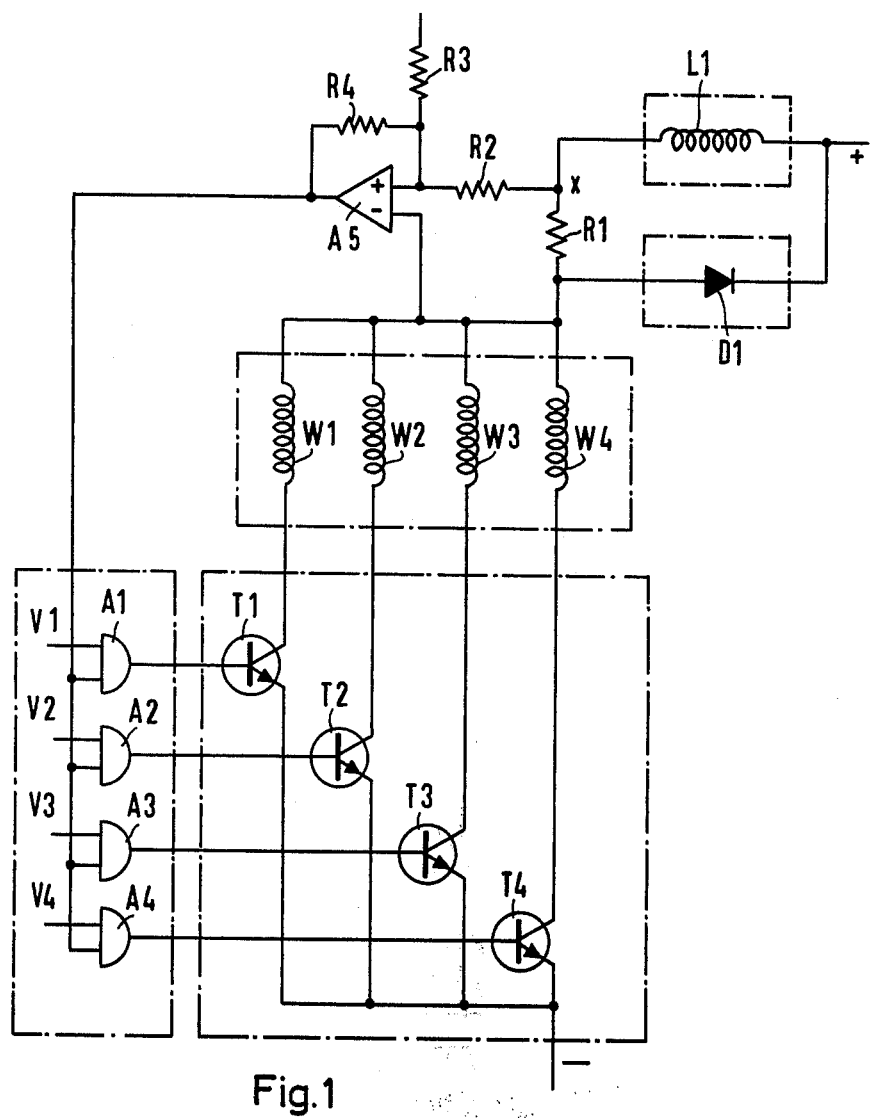
FIG. 1 shows Y-connected stator windings with electronic commutation controlled by a current regulator.

FIG. 1, shows four windings designated W1 to W4 which form the Y-connected stator winding of a brushless D.C. motor. One end of each winding leg W1 to W4 is connected to the negative pole of a D.C. voltage source by means the collector-emitter path of a transistor T1 to T4. The transistors T1 to T4 constitute the electronic commutation device. The other ends of the windings legs W1 to W4 are Y-connected and are connected to the other pole of the D.C. voltage source by means of a resistor R1 for measuring the actual value of the current and a smoothing choke L1. A by-pass diode D1 is connected parallel to the resistor R1 and the smoothing choke L1.

To the junction point x of the resistor R1 and the smoothing choke L1, the non-inverting input of an operational amplifier A5, which constitutes the current regulator, is connected by means an input resistor R2. A reference voltage is furthermore applied to this input by means of a reference-value resistor R3. In addition, an input signal is applied from the output of the operational amplifier A5 by means of feedback resistor R4. The inverting input of the operational amplifier A5 is connected to the Y-point of the windings legs W1 to W4. The output of the operational amplifier A5 is connected to the respective inputs of AND gates A1 to A4. To another input of these AND gates A1 to A4 is applied in each case a signal V1 to V4, proportional to the position of the motor rotor. The signals V1 to V4 may be the Hall voltages of Hall-effect generators, which are arranged in the motor solely for ascertaining the position of the rotor. The output of each AND gate A1 to A4 is connected to the base of one of the transistors T1 to T4. Thus, the transistors T1 to T4 are controlled by the output signals of the logic elements A1 to A4.

The operational amplifier A5 constituting the current regulator operates as an on-off control, i.e., the operational amplifier A5 changes the polarity of its output signal at an upper and lower instantaneous values of the current in the smoothing choke L1. The signals delivered by the operational amplifier A5 are applied to the logic elements A1 to A4. These signals are passed on to the corresponding transistor T1 to T4 by that logic element A1 to A4, at which one of the signals V1 to V4 is present at the same time. The transistors T1 to T4 are therefore switched in the rhythm of the signals delivered by the operational amplifier A5. The cycling frequency of the operational amplifier A5 adjusts itself so that the mean value of the current in the smoothing choke L1 remains constant. As the mean value of the current in the smoothing choke L1 has a defined relationship with the mean value of the motor current in the motor, the current is controlled directly by means the commutation device and no separate control output stage is required.

Figure 2:
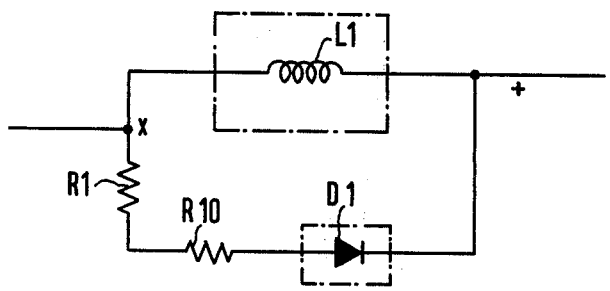
FIG. 2 shows a resistor in series with the by-pass diode.

If an ohmic resistance R10 (FIG. 2) is connected in series with the by-pass diode D1, a linearization of the characteristic is achieved, such that the motor current depends on the current in the smoothing choke L1.

The described arrangement of the smoothing choke, the resistor for measuring the actual value of current flowing in the windings and the by-pass diode, in combination a current regulator and electronic commutation device, provides a means to cyclicly control the current flowing in a brushless D.C. motor with a Y-connected stator winding. A separate control stage is thereby obviated.

What is claimed is:

1. In combination with a D.C. motor with Y-connected stator windings wherein each stator winding is connected in series with an electronic commutation device, a current control circuit comprising, a series connected smoothing choke and current measuring resistor wherein said resistor is connected to the commons connection of the windings, a by-pass diode connected in parallel across said series connected choke and resistor, a current regulator comprising, means for generating a signal proportional to the voltage across said current measuring resistor, and means for cyclically connecting the output of said current regulator to the electronic commutation devices connected to the windings.

2. The current control circuit of claim 1 having a resistor connected in series with said by-pass diode.

3. The current control circuit of claim 1 wherein said current regulator is an operational amplifier with resistive feedback wherein the non-inverting input terminal is connected by means of an input resistor to the connection between said choke inductor and said current measuring resistor, and the inverting input is connected to the common terminal of said Y-connected stator windings.

* * * * *